(12) United States Patent
Shinkai

(10) Patent No.: US 10,886,806 B2
(45) Date of Patent: Jan. 5, 2021

(54) ROTATING ELECTRICAL MACHINE

(71) Applicant: DENSO CORPORATION, Kariya (JP)

(72) Inventor: Tomoyuki Shinkai, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/388,969

(22) Filed: Apr. 19, 2019

(65) Prior Publication Data

US 2019/0245400 A1 Aug. 8, 2019

Related U.S. Application Data

(63) Continuation of application No. PCT/JP2017/037946, filed on Oct. 20, 2017.

(30) Foreign Application Priority Data

Oct. 21, 2016 (JP) ................... 2016-206536

(51) Int. Cl.
*H02K 9/19* (2006.01)
*H02K 3/24* (2006.01)

(52) U.S. Cl.
CPC ............ *H02K 3/24* (2013.01); *H02K 9/19* (2013.01)

(58) Field of Classification Search
CPC .......... H02K 9/19; H02K 9/197; H02K 9/005; H02K 3/24; H02K 3/505; H02K 5/20
See application file for complete search history.

(56) References Cited

U.S. PATENT DOCUMENTS

| | | | | |
|---|---|---|---|---|
| 4,413,201 A | * | 11/1983 | Nikitin | H02K 9/197 310/214 |
| 4,442,371 A | * | 4/1984 | Utsunomiya | H02K 9/00 310/260 |
| 4,517,479 A | * | 5/1985 | Aleem | H02K 9/197 310/260 |
| 5,757,095 A | | 5/1998 | Ohmi et al. | |
| 8,786,146 B2 | * | 7/2014 | Cai | H02K 9/19 310/260 |

(Continued)

FOREIGN PATENT DOCUMENTS

| JP | 2927288 B2 | 7/1999 |
|---|---|---|
| JP | 2003-333786 A | 11/2003 |

(Continued)

OTHER PUBLICATIONS

Jan. 16, 2018 International Search Report issued in International Patent Application No. PCT/JP2017/037946.

*Primary Examiner* — Dang D Le
(74) *Attorney, Agent, or Firm* — Oliff PLC

(57) ABSTRACT

A motor generator includes three types of cooling through-holes. The cooling through-holes are three types of holes passing through the coil end portions in the radial direction and having different flow capacities that allow different amounts of liquid refrigerant to flow. Holes with larger flow capacities allow larger amounts of liquid refrigerant to flow therethrough. In the motor generator, the three types of cooling through-holes are arranged as appropriate according to the temperature increase characteristics of the coil end portions. Consequently, in the motor generator, an appropriate amount of liquid refrigerant can be delivered to each part of the coil end portions according to the difference in temperature increase rate.

11 Claims, 15 Drawing Sheets

(56) References Cited

U.S. PATENT DOCUMENTS

2009/0140601 A1* 6/2009 Tanaka .................... H02K 3/51
                                                    310/262
2014/0292119 A1* 10/2014 Takahashi ................ H02K 3/24
                                                    310/54

FOREIGN PATENT DOCUMENTS

| JP | 2010-081787 A | 4/2010 |
| JP | 2013-13229 A | 1/2013 |
| JP | 2013-229979 A | 11/2013 |
| JP | 2016-135078 A | 7/2016 |

* cited by examiner

ROTATING ELECTRICAL MACHINE

CROSS-REFERENCE TO RELATED APPLICATION

The present application is a continuation application of International Application No. PCT/JP2017/037946, filed Oct. 20, 2017, which claims priority to Japanese Patent Application No. 2016-206536, filed Oct. 21, 2016. The contents of these applications are incorporated herein by reference in their entirety.

BACKGROUND

1. Technical Field

The present disclosure relates to a rotating electrical machine.

2. Related Art

A rotating electrical machine includes a stator core and a stator coil having a coil end portion protruding from an axial end of the stator core in the axial direction.

SUMMARY

The present disclosure provides a rotating electrical machine. In the present disclosure, a rotating electrical machine includes different types of cooling through-holes. The cooling through-holes are different types of holes passing through the coil end portions in the radial direction and having different flow capacities that allow different amounts of liquid refrigerant to flow. Holes with larger flow capacities allow larger amounts of liquid refrigerant to flow therethrough. In the rotating electrical machine, the different types of cooling through-holes are arranged as appropriate according to the temperature increase characteristics of the coil end portions.

DETAILED DESCRIPTION OF THE PREFERRED EMBODIMENTS

Figure 1:
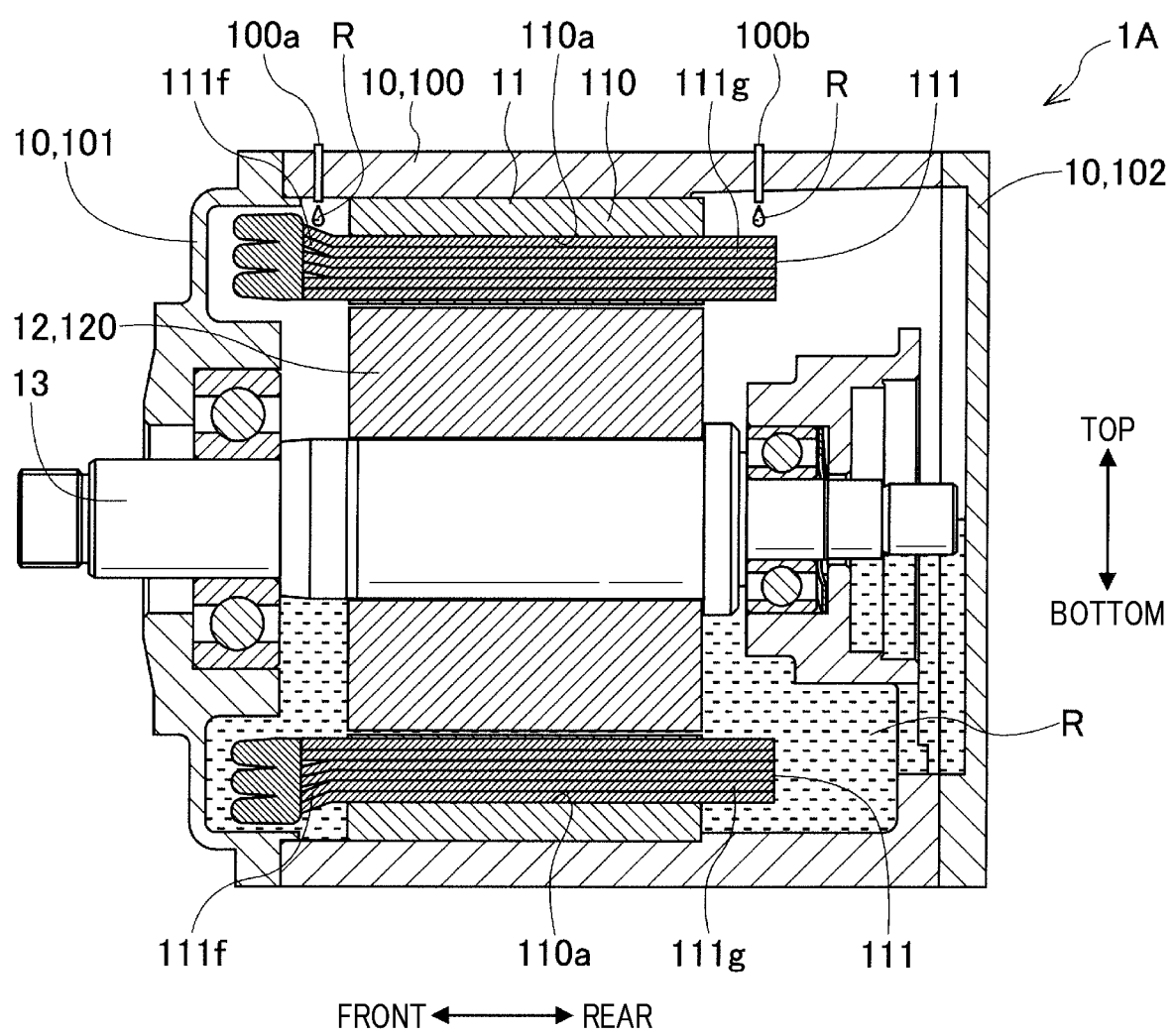
FIG. 1 is an axial cross-sectional view of a motor generator according to the first embodiment.

The inventor of the present disclosure has studied the following technique as a rotating electrical machine for being capable of uniformly cooling a coil end portion of a stator core using a liquid refrigerant.

The vehicle AC generator disclosed in Japanese Patent No. 2927288 (JP 2927288 B) is an example of a rotating electrical machine.

This vehicle AC generator includes a stator iron core and a stator winding. The stator winding includes a coil end protruding from an axial end of the stator iron core in the axial direction. The coil end is provided with a vent through which cooling air flows. The stator iron core, the stator winding, and the coil end of the vehicle AC generator correspond to the stator core, the stator coil, and the coil end portion of a rotating electrical machine.

A current flowing through the stator winding produces heat in the stator winding and increases the temperature of the stator winding. Accordingly, the temperature of the coil end increases. However, the coil end is provided with the vent. Therefore, cooling air flowing through the vent directly cools the coil end and prevents the coil end from overheating.

The proximal part of the coil end close to the stator iron core dissipates heat through the stator iron core. Therefore, the temperature of the proximal part close to the stator iron core is unlikely to increase. However, it is more difficult for the distal part of the coil end further from the stator iron core to dissipate heat through the stator iron core. Therefore, the temperature of the distal part further from the stator iron core is liable to increase. Thus, the vent in the coil end alone is not enough to uniformly cool the coil end. In order to improve the cooling performance, a liquid refrigerant is also used for cooling. However, even the liquid refrigerant as an alternative to cooling air cannot uniformly cool the coil end.

The present disclosure provides a rotating electrical machine capable of uniformly cooling a coil end portion of a stator core using a liquid refrigerant.

A rotating electrical machine according to an aspect of the technique of the present disclosure includes: an annular stator core; a stator coil provided on the stator core and having a coil end portion protruding from an axial end of the stator core in an axial direction; and a plurality of cooling through-holes passing through the coil end portion in a radial direction and having different capacities that allow different amounts of liquid refrigerant to flow.

According to this configuration, the rotating electrical machine of the present disclosure includes multiple types of cooling through-holes having different capacities that allow different amounts of liquid refrigerant to flow. Cooling through-holes with larger capacities allow larger amounts of liquid refrigerant to flow therethrough. Therefore, cooling through-holes with larger capacities have higher levels of cooling performance. Thus, in the rotating electrical machine according the present disclosure, multiple types of cooling through-holes having different capacities that allow different amounts of liquid refrigerant to flow are arranged as appropriate according to the temperature increase characteristics of the coil end portion. Consequently, in the rotating electrical machine according the present disclosure, an appropriate amount of liquid refrigerant can be delivered to each part of the coil end portion according to the difference in temperature increase rate. Therefore, in the rotating electrical machine according the present disclosure, the coil end portion can be uniformly cooled by the liquid refrigerant.

Note that, the foregoing and other features and advantages of the present disclosure will become more apparent in the light of the following detailed description of preferred embodiments thereof as discussed and illustrated in the accompanying drawings.

Next, the technique of the present disclosure will be described in detail using some embodiments. In the following embodiments, a rotating electrical machine of the present disclosure is applied to a motor generator mounted in a vehicle.

First Embodiment

<Configuration of Motor Generator>

The configuration of a motor generator according to the present embodiment will be described with reference to FIGS. 1 to 10. The directions "front" and "rear" in the drawings are for descriptive purposes only. A part of FIG. 1 is immersed in a liquid refrigerant. This part is indicated by broken lines so that its configuration is clearly visible.

The motor generator 1A illustrated in FIG. 1 is mounted in a vehicle. The motor generator 1A operates as a motor and generates drive force for driving the vehicle when power is supplied from the battery to the motor generator 1A. The motor generator 1A also operates as a generator and generates power for charging the battery when drive force is supplied from the engine of the vehicle to the motor generator 1A. The motor generator 1A includes a housing 10, a stator 11, a rotor 12, and a rotation axis 13.

The housing 10 is a member that contains the stator 11 and the rotor 12 and rotatably supports the rotation axis 13. The housing 10 includes a center housing 100, a front housing 101, and a rear housing 102.

The center housing 100 is a cylindrical metal member that contains the stator 11 and the rotor 12 and rotatably supports the rear end of the rotation axis 13. The center housing 100 includes refrigerant inlet nozzles 100a and 100b.

The refrigerant inlet nozzle 100a is a member that drops a liquid refrigerant R on a coil end portion 111f (described later) from the outside. The refrigerant inlet nozzle 100a is provided at a position where the liquid refrigerant R can be dropped on the uppermost part of the coil end portion 111f.

The refrigerant inlet nozzle 100b is a member that drops the liquid refrigerant R on a coil end portion 111g (described later) from the outside. The refrigerant inlet nozzle 100b is provided at a position where the liquid refrigerant R can be dropped on the uppermost part of the coil end portion 111g.

The front housing 101 is a discoid metal member that covers the front opening of the center housing 100 and rotatably supports the front end of the rotation axis 13.

The rear housing 102 is a discoid metal member that covers the rear opening of the center housing 100.

The stator 11 is a member that constitutes a part of the magnetic path and generates a magnetic flux when a current flows therethrough. The stator 11 is also a member that constitutes a part of the magnetic path and generates an alternating current by being interlinked with the magnetic flux generated by the rotor 12 (described later). As illustrated in FIGS. 2 to 6, the stator 11 includes a stator core 110, a stator coil 111, and three types of cooling through-holes 112, 113, and 114. The three types of cooling through-holes 112, 113, and 114 mean three kinds of cooling through-holes having different hole characteristics.

Figure 2:
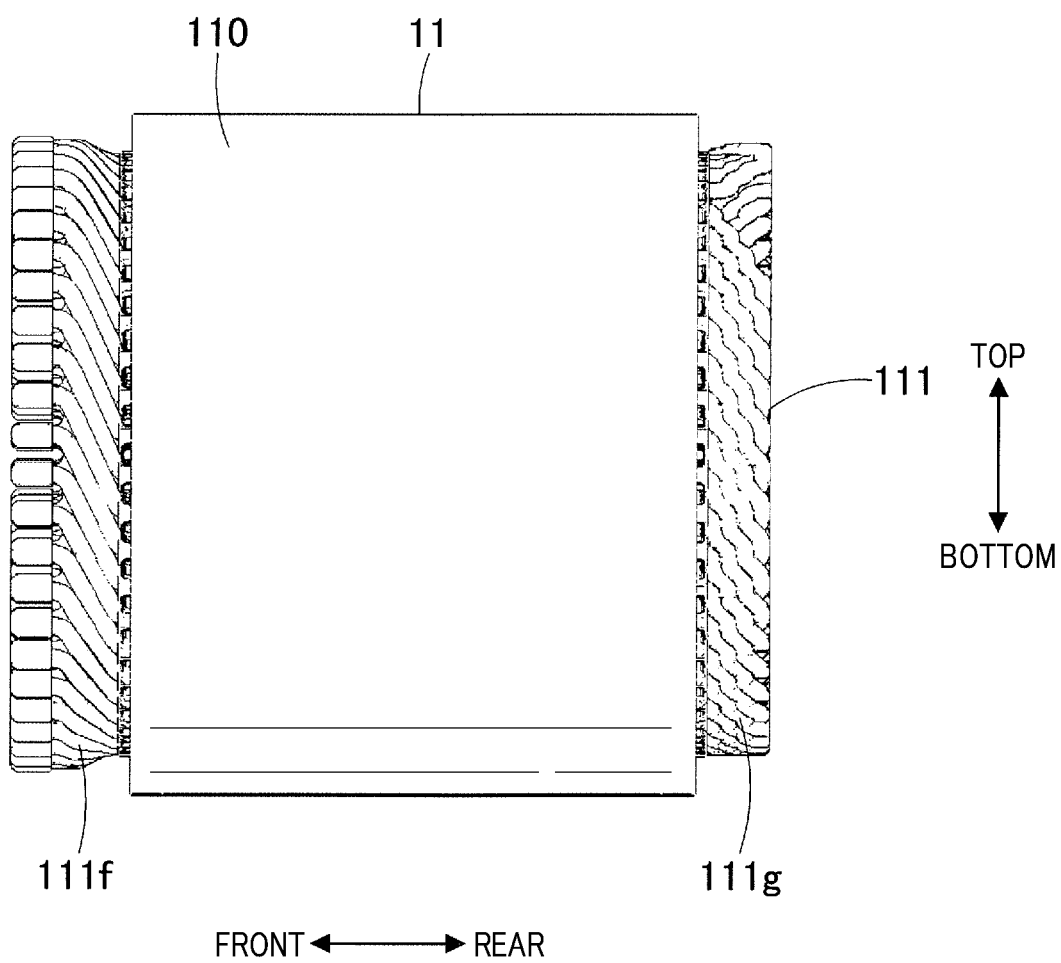
FIG. 2 is a side view of a stator in FIG. 1.
Figure 3:
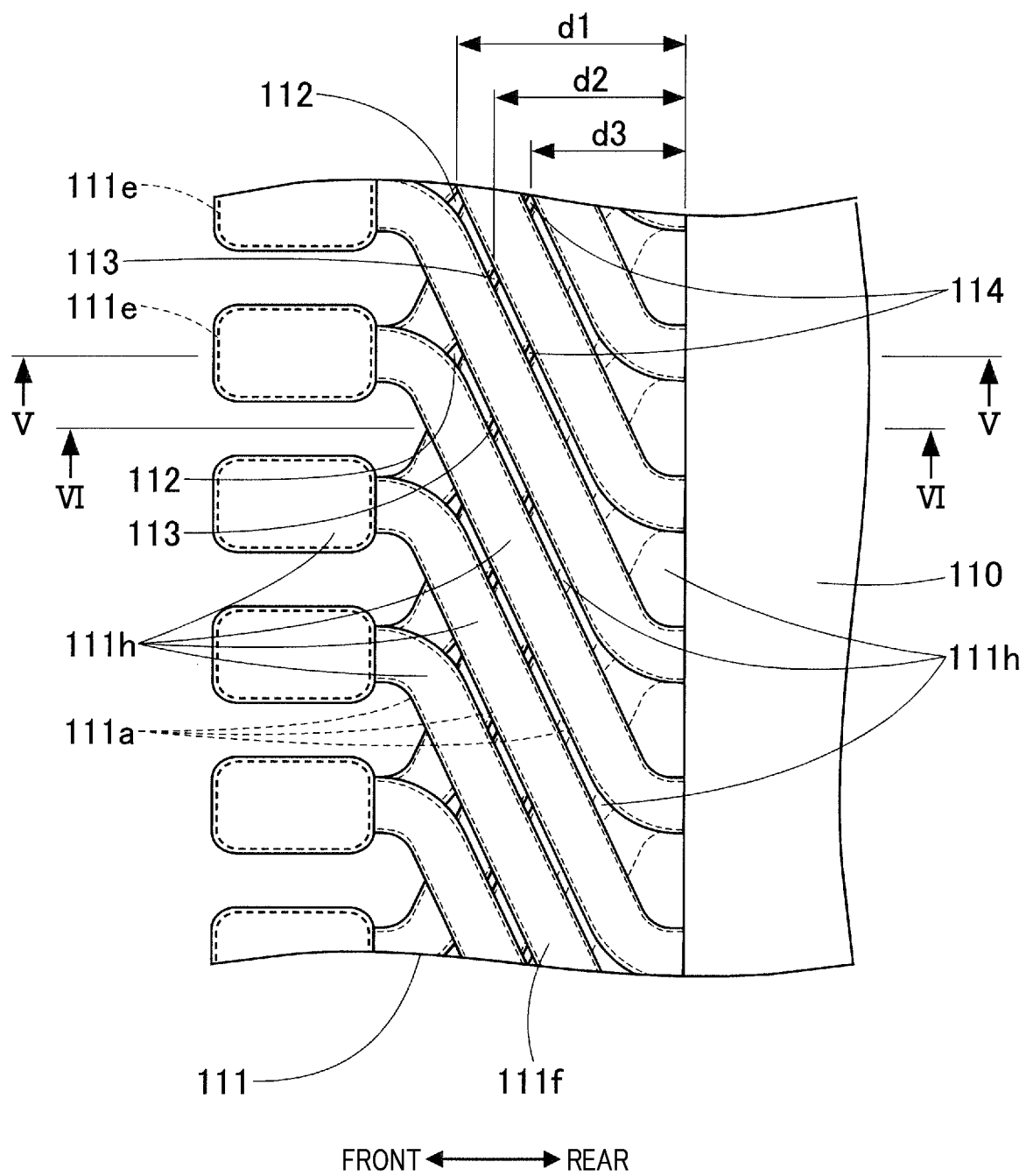
FIG. 3 is an outside partial enlarged view of FIG. 1 illustrating a region around a front coil end portion.
Figure 4:
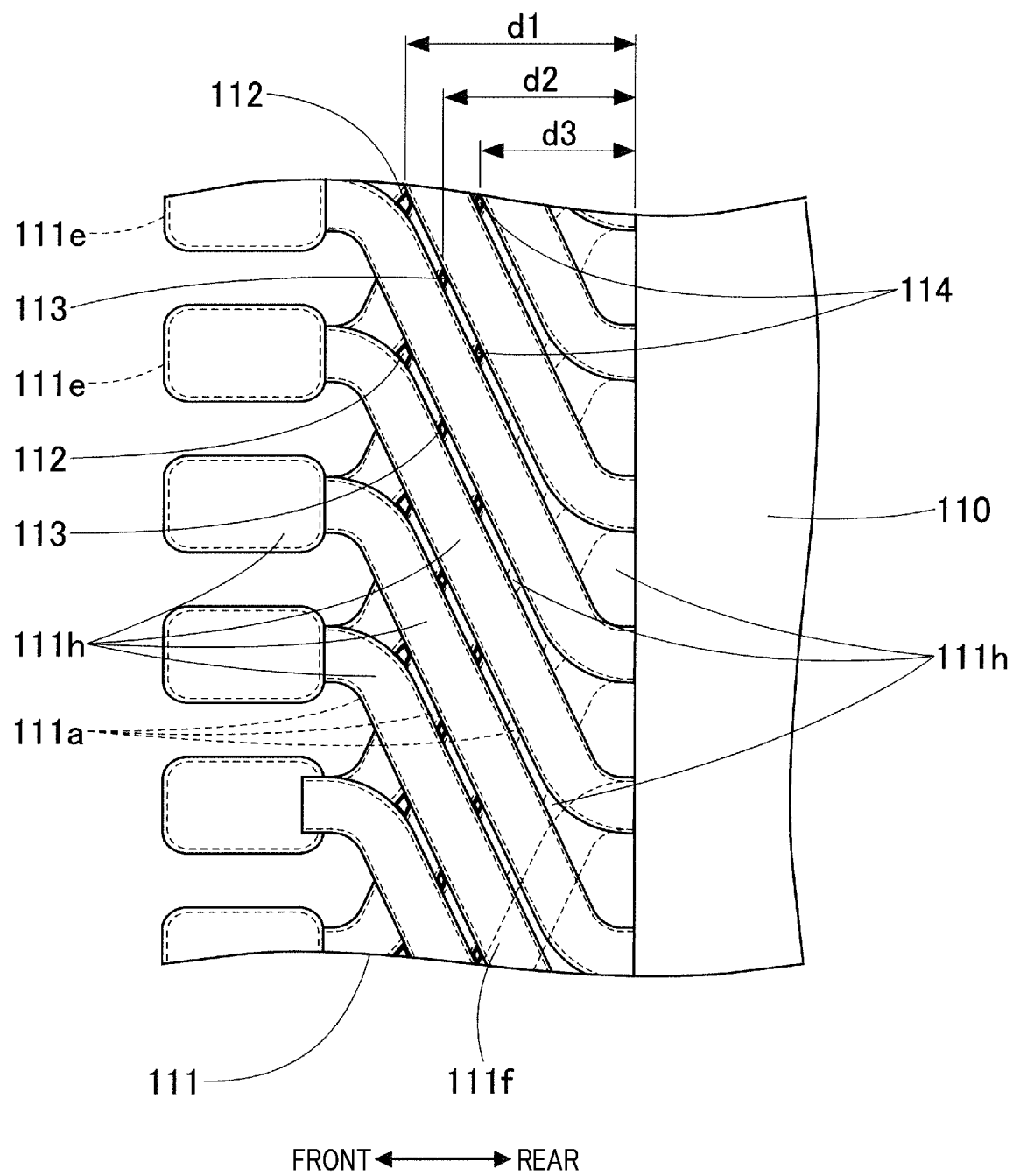
FIG. 4 is an inside partial enlarged view of FIG. 1 illustrating a region around the front coil end portion.

As illustrated in FIGS. 1 and 2, the stator core 110 is an annular magnetic member that constitutes a part of the magnetic path and holds the stator coil 111. The stator core 110 includes a plurality of rectangular slots 110a extending in the axial direction. The rectangular slots 110a are provided at regular intervals in the circumferential direction. The stator core 110 is fixed to the inner peripheral surface of the center housing 100.

Figure 7:
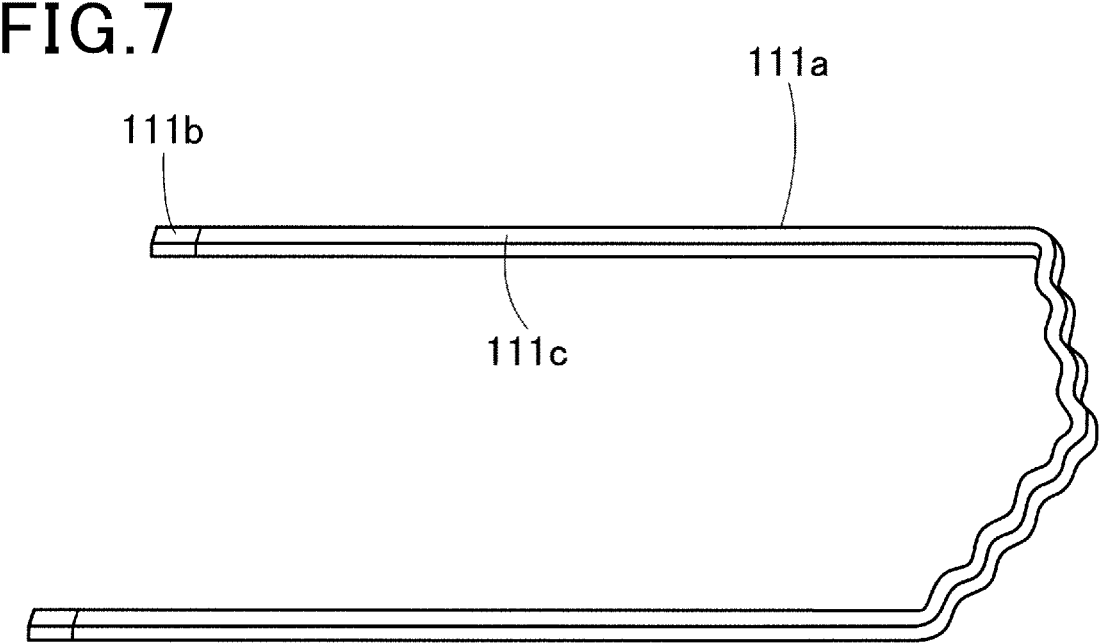
FIG. 7 is a perspective view of one of the conductor segments constituting a stator coil in FIG. 1.

The stator coil 111 is a member that generates a magnetic flux when a current flows therethrough. The stator coil 111 is also a member that generates an alternating current by being interlinked with the magnetic flux generated by the rotor 12. The stator coil 111 includes conductor segments 111a, one of which is illustrated in FIG. 7. Specifically, the stator coil 111 includes a plurality of conductor segments 111a welded together.

Each of the conductor segments 111a is a U-shaped member that constitutes the stator coil 111. The conductor segments 111a each include a conductive wire 111b and an outer peripheral insulation member 111c.

The conductive wire 111b is a rod-like copper member with a rectangular cross-section that conducts electricity. The conductive wire 111b is molded in a bent U-shape.

The outer peripheral insulation member 111c is an insulating resin member. The whole conductive wire 111b except its ends is coated with the outer peripheral insulation member 111c.

Figure 5:
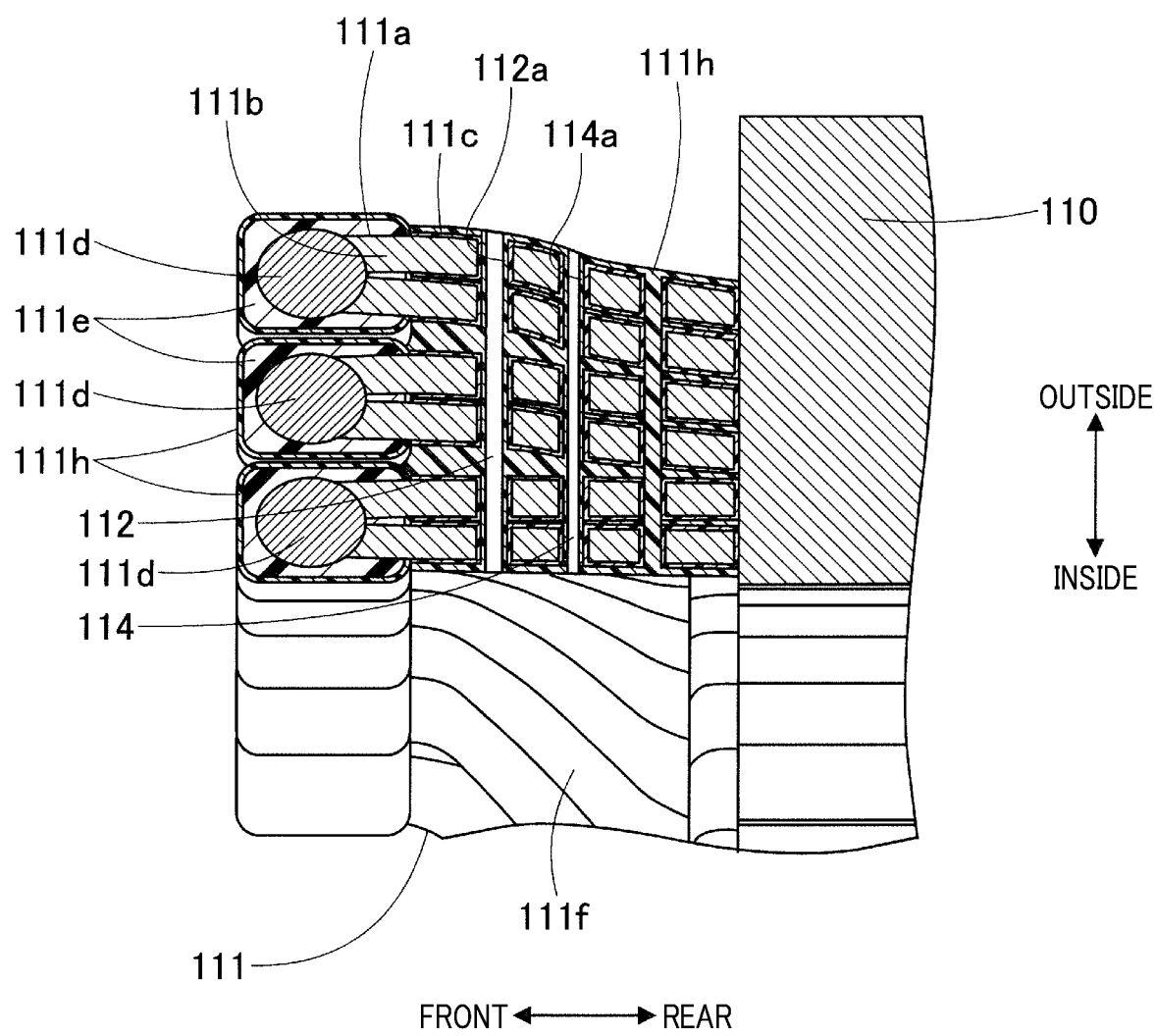
FIG. 5 is a cross-sectional view taken along V-V in FIG. 3.

The conductor segments 111a are inserted into the slots 110a from the rear side of the stator core 110 illustrated in FIG. 1. The ends of each conductor segment 111a protrude from the axial front end of the stator core 110. The stator coil 111 is formed by bending the ends of each conductor segment 111a and welding one end of each conductor segment 111a to one end of a predetermined conductor segment 111a. As illustrated in FIG. 5, a welded portion 111d and the ends of the outer peripheral insulation members 111c connected thereto are integrally coated with a welded portion insulation member 111e including an insulating resin.

<Configuration of Stator Coil>

As illustrated in FIGS. 1 and 2, the stator coil 111 includes the coil end portions 111f and 111g.

The coil end portion 111f protrudes from the axial front end of the stator core 110 in the axial forward direction. As illustrated in FIGS. 3 to 6, the coil end portion 111*f* is formed by the ends of the conductor segments 111*a* whose distal ends are bent in the radially outward direction and welded together. The coil end portion 111*f* is divided into a small-diameter section, a bent section, and a large-diameter section in order from the stator core 110 to the distal end.

As illustrated in FIGS. 1 and 2, the coil end portion 111*g* protrudes from the axial rear end of the stator core 110 in the axial rearward direction. The coil end portion 111*g* includes the U-shaped bent portions of the conductor segments 111*a*. The distal end of the coil end portion 111*g* is bent in the radially outward direction.

As illustrated in FIGS. 3 to 6, the stator coil 111 is coated with an adhesive member 111*h* including an insulating resin. Consequently, the conductor segments 111*a* adhere to one another. The conductor segments 111*a* also adhere to the stator core 110.

As illustrated in FIGS. 3 to 6 and FIGS. 8 to 10, the cooling through-holes 112 to 114 pass through the coil end portions 111*f* and 111*g* in the radial direction. The liquid refrigerant R flows through the cooling through-holes 112 to 114. Specifically, the cooling through-holes 112 to 114 pass through the coil end portions 111*f* and 111*g* radially around the axial center of the stator core 110. The cooling through-holes 112 to 114 are provided in predetermined parts of the coil end portion 111*f* that are to be cooled by a flow of the liquid refrigerant R. The cooling through-holes 112 are provided at the axial forward distance d1 from the axial front end of the stator core 110 (in the large-diameter section) at regular intervals over the entire circumference of the coil end portion 111*f*. The cooling through-holes 113 are provided at the axial forward distance d2 (<d1) from the axial front end of the stator core 110 (in the bent section) at regular intervals over the entire circumference of the coil end portion 111*f*. The cooling through-holes 114 are provided at the axial forward distance d3 (<d2) from the axial front end of the stator core 110 (in the small-diameter section) at regular intervals over the entire circumference of the coil end portion 111*f*.

The cooling through-holes 112 to 114 are formed by the spaces between the conductor segments 111*a* constituting the stator coil 111. The conductor segments 111*a* cross one another to form these spaces. The cooling through-holes 112 to 114 are covered with resin layers 112*a*, 113*a*, and 114*a* formed by the adhesive member 111*h*. Note that the coil end portion 111*f* includes spaces between the crossing conductor segments 111*a* at positions that are closer to the axial front end of the stator core 110 than the cooling through-holes 114 are. However, these spaces are sealed with the adhesive member 111*h*.

The opening width W2 of each of the cooling through-holes 112 to 114 in the inner part of the coil end portion 111*f* is smaller than the opening width W1 of that cooling through-hole in the outer part of the coil end portion 111*f* (W2<W1). The cooling through-holes 112, the cooling through-holes 113, and the cooling through-holes 114 have different lengths. Specifically, the cooling through-holes 112 have the largest length L2, and the cooling through-holes 114 have the smallest length L4. In other words, the cooling through-holes 112 are longer than the cooling through-holes 113, and the cooling through-holes 113 are longer than the cooling through-holes 114 (L2>L3>L4). The cooling through-holes 112, the cooling through-holes 113, and the cooling through-holes 114 have different flow capacities (liquid capacities). Specifically, the cooling through-holes 112 have the largest capacity C2, and the cooling through-holes 114 have the smallest capacity C4. In other words, the cooling through-holes 112 have a larger capacity than the cooling through-holes 113, and the cooling through-holes 113 have a larger capacity than the cooling through-holes 114 (C2>C3>C4).

The cooling through-holes 112 to 114 have different flow capacities depending on how far they are from the axial front end of the stator core 110 in the axial forward direction. Specifically, the cooling through-holes 112 to 114 located farther from the axial front end of the stator core 110 in the axial forward direction have larger flow capacities. More specifically, the cooling through-holes 112 having the largest capacity are provided at the axial forward distance d1 from the axial front end of the stator core 110 at regular intervals in the circumferential direction. The cooling through-holes 113 having a smaller capacity than the cooling through-holes 112 are provided at the axial forward distance d2(<d1) from the axial front end of the stator core 110 at regular intervals in the circumferential direction. The cooling through-holes 114 having the smallest capacity are provided at the axial forward distance d3 (<d2) from the axial front end of the stator core 110 at regular intervals in the circumferential direction. The intervals between the conductor segments 111*a* increase as the conductor segments 111*a* extend toward the distal end where they are bent in the radially outward direction. Therefore, cooling through-holes located closer to the distal end bent in the radially outward direction have larger cross-sectional areas. Cooling through-holes located closer to the distal end bent in the radially outward direction also have larger radial lengths. Thus, cooling through-holes located closer to the distal end bent in the radially outward direction have larger capacities.

Note that the cooling through-holes 112 to 114 are also formed in the coil end portion 111*g* (not illustrated) in the same manner as in the coil end portion 111*f*.

The rotor 12 illustrated in FIG. 1 is an annular member that constitutes a part of the magnetic path and generates a magnetic flux. The rotor 12 generates torque by being interlinked with the magnetic flux generated by the stator 11. The rotor 12 is rotated by the drive force supplied from the engine of the vehicle. The rotor 12 interlinks the magnetic flux generated by the rotation with the stator coil 111 to generate an alternating current in the stator coil 111. The rotor 12 includes a rotor core 120.

The rotor core 120 is an annular magnetic member that constitutes a part of the magnetic path and holds a magnet. The rotor core 120 is rotatably provided, with its outer peripheral surface facing the inner peripheral surface of the stator core 110 in the radial direction.

The rotation axis 13 is a columnar metal member that rotates together with the rotor core 120. The rotation axis 13 is fixed to the rotor core 120 and rotatably supported by the center housing 100 and the front housing 101 via a bearing.

<Description of Operation of Motor Generator and Cooling Performance>

Next, the operation of the motor generator 1A according to the present embodiment and how the liquid refrigerant R cools the coil end portions 111*f* and 111*g* will be described with reference to FIG. 1.

The motor generator 1A illustrated in FIG. 1 operates as a motor when power is supplied from the battery to the motor generator 1A. Once power is supplied from the battery to the motor generator 1A, a current flows through the stator coil 111 to generate a magnetic flux. In the motor generator 1A, the magnetic flux generated by the stator coil 111 is interlinked with the rotor 12, whereby the rotor 12 generates torque. In this way, the motor generator 1A generates drive force for driving the vehicle.

Moreover, the motor generator 1A operates as a generator when drive force is supplied from the engine of the vehicle to the motor generator 1A. Once drive force is supplied from the engine of the vehicle to the motor generator 1A, the rotor 12 rotates. In the motor generator 1A, the magnetic flux generated by the rotor 12 is interlinked with the stator coil 111, whereby the stator coil 111 generates an alternating current. In this way, the motor generator 1A generates power for charging the battery.

A current flowing through the stator coil 111 produces heat in the stator coil 111 and increases the temperature of the stator coil 111. Accordingly, the temperature of the coil end portions 111$f$ and 111$g$ increases.

The proximal part of each of the coil end portions 111$f$ and 111$g$ close to the stator core 110 dissipates heat through the stator core 110. Therefore, the temperature of the proximal part close to the stator core 110 is unlikely to increase. However, it is more difficult for the distal part of each of the coil end portions 111$f$ and 111$g$ further from the stator core 110 to dissipate heat through the stator core 110. Therefore, the temperature of the distal part further from the stator core 110 is liable to increase.

The housing 10 includes the refrigerant inlet nozzles 100$a$ and 100$b$. The liquid refrigerant R is dropped on the outer peripheral surfaces of the coil end portions 111$f$ and 111$g$ through the refrigerant inlet nozzles 100$a$ and 100$b$, respectively. The dropped liquid refrigerant R flows from the outside to the inside of the coil end portions 111$f$ and 111$g$ through the cooling through-holes 112 to 114. Consequently, the liquid refrigerant R cools the coil end portions 111$f$ and 111$g$. The liquid refrigerant R is then stored in the lower part (indicated by broken lines in FIG. 1) of the housing 10. The stored liquid refrigerant R is discharged from a refrigerant outlet (not illustrated) provided in the lower part of the housing 10. The discharged liquid refrigerant R is returned to the refrigerant inlet nozzles 100$a$ and 100$b$ using a pump or the like.

Figure 8:
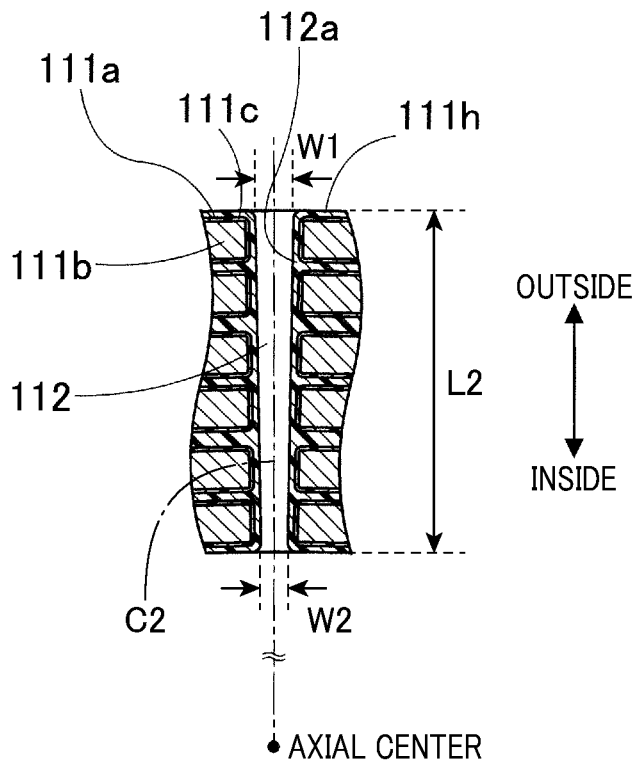
FIG. 8 is a front cross-sectional view of FIGS. 3 and 4 illustrating the cooling through-hole farthest from the axial front end of a stator core.
Figure 9:
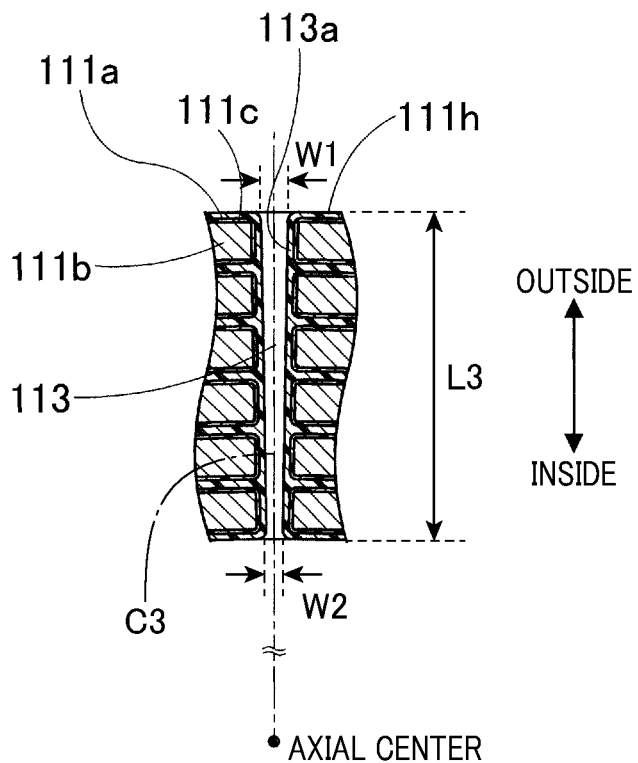
FIG. 9 is a front cross-sectional view of FIGS. 3 and 4 illustrating the cooling through-hole second farthest from the axial front end of the stator core.
Figure 10:
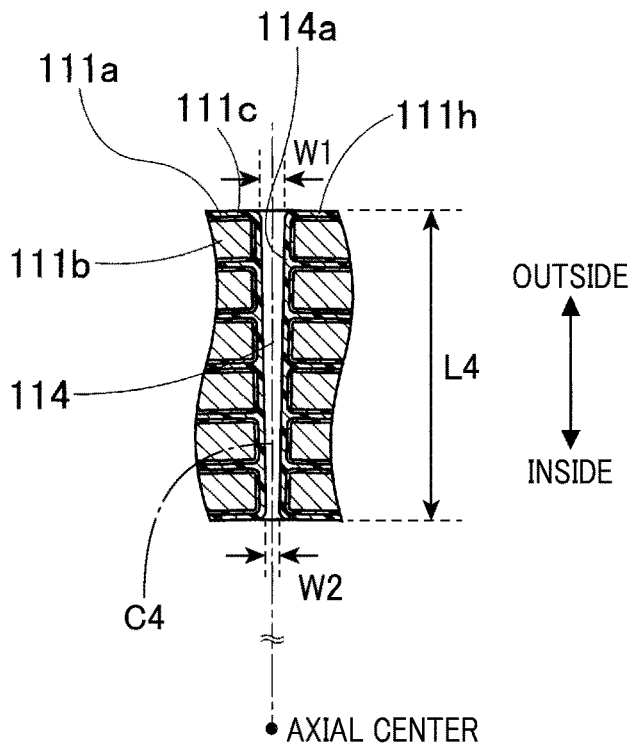
FIG. 10 is a front cross-sectional view of FIGS. 3 and 4 illustrating the cooling through-hole closest to the axial front end of the stator core.

As illustrated in FIGS. 8 to 10, the cooling through-holes 112, the cooling through-holes 113, and the cooling through-holes 114 have different flow capacities. Cooling through-holes with larger capacities allow larger amounts of liquid refrigerant R to flow therethrough. Therefore, the cooling performance of the coil end portions 111$f$ and 111$g$ increases. As illustrated in FIGS. 3 to 6, the cooling through-holes 112 to 114 located farther from the axial front end of the stator core 110 in the axial forward direction have larger flow capacities. Similarly, the cooling through-holes 112 to 114 located farther from the axial rear end of the stator core 110 in the axial rearward direction have larger capacities. As described above, the coil end portions 111$f$ and 111$g$ have different temperature increase characteristics at different positions relative to the stator core 110. Therefore, in the stator coil 111 according to the present embodiment, the three types of cooling through-holes 112 to 114 having different flow capacities are arranged as appropriate according to the difference in temperature increase rate in the coil end portions 111$f$ and 111$g$. As a result, in the motor generator 1A according to the present embodiment, a larger amount of liquid refrigerant R can be delivered to the parts of the coil end portions 111$f$ and 111$g$ which are liable to get hot. More specifically, in the motor generator 1A, a larger amount of liquid refrigerant R can be delivered to the distal parts of the coil end portions 111$f$ and 111$g$ further from the axial ends of the stator core 110. Thus, in the motor generator 1A according to the present embodiment, the coil end portions 111$f$ and 111$g$ can be uniformly cooled by the liquid refrigerant R.

<Effects>

The effects of the motor generator 1A according to the present embodiment will be described.

According to the present embodiment, the motor generator 1A includes the stator core 110, the stator coil 111, and the three types of cooling through-holes 112 to 114. The stator core 110 is an annular member. The stator coil 111 is a member having the coil end portions 111$f$ and 111$g$ protruding from the axial ends of the stator core 110 in the axial direction. The cooling through-holes 112 to 114 are three types of holes passing through the coil end portions 111$f$ and 111$g$ in the radial direction and having different capacities that allow different amounts of liquid refrigerant R to flow. Cooling through-holes with larger capacities allow larger amounts of liquid refrigerant R to flow therethrough. Therefore, cooling through-holes with larger capacities have higher levels of cooling performance. Thus, in the motor generator 1A according to the present embodiment, the three types of cooling through-holes 112 to 114 having different flow capacities that allow different amounts of liquid refrigerant R to flow are arranged as appropriate according to the temperature increase characteristics of the coil end portions 111$f$ and 111$g$. Consequently, in the motor generator 1A according to the present embodiment, an appropriate amount of liquid refrigerant R can be delivered to each part of the coil end portions 111$f$ and 111$g$ according to the difference in temperature increase rate. As a result, in the motor generator 1A according to the present embodiment, the coil end portions 111$f$ and 111$g$ can be uniformly cooled by the liquid refrigerant R.

According to the present embodiment, the cooling through-holes 112 to 114 are provided in predetermined parts of the coil end portions 111$f$ and 111$g$ that are to be cooled by a flow of the liquid refrigerant R. Consequently, in the motor generator 1A according to the present embodiment, desired parts of the coil end portions 111$f$ and 111$g$ can be reliably cooled.

The coil end portions 111$f$ and 111$g$ have different temperature increase characteristics depending on the axial distance from the axial ends of the stator core 110. According to the present embodiment, the cooling through-holes 112 to 114 have different flow capacities that allow different amounts of liquid refrigerant R to flow depending on how far they are from the axial ends of the stator core 110 in the axial direction. Specifically, in the motor generator 1A according to the present embodiment, the three types of cooling through-holes 112 to 114 having different flow capacities are arranged according to the difference in temperature increase rate in the coil end portions 111$f$ and 111$g$. Consequently, in the motor generator 1A according to the present embodiment, the coil end portions 111$f$ and 111$g$ can be uniformly cooled by the liquid refrigerant R.

The proximal part of each of the coil end portions 111$f$ and 111$g$ close to the stator core 110 dissipates heat through the stator core 110. Therefore, the temperature of the proximal part close to the stator core 110 is unlikely to increase. However, it is more difficult for the distal part of each of the coil end portions 111$f$ and 111$g$ further from the stator core 110 to dissipate heat through the stator core 110. Therefore, the temperature of the distal part further from the stator core 110 is liable to increase. According to the present embodiment, the cooling through-holes 112 to 114 located farther from the axial ends of the stator core 110 in the axial direction have larger flow capacities that allow larger amounts of liquid refrigerant R to flow. Specifically, in the motor generator 1A according to the present embodiment, the three types of cooling through-holes 112 to 114 having different flow capacities are arranged as appropriate according to the difference in temperature increase rate in the coil end portions 111f and 111g. As a result, in the motor generator 1A according to the present embodiment, a larger amount of liquid refrigerant R can be delivered to the parts of the coil end portions 111f and 111g which are liable to get hot. More specifically, in the motor generator 1A, a larger amount of liquid refrigerant R can be delivered to the distal parts of the coil end portions 111f and 111g further from the axial ends of the stator core 110. Thus, in the motor generator 1A according to the present embodiment, the coil end portions 111f and 111g can be uniformly cooled by the liquid refrigerant R.

The liquid refrigerant R is dropped on the outer peripheral surfaces of the coil end portions 111f and 111g. Therefore, the liquid refrigerant R is delivered from the outside to the inside of the coil end portions 111f and 111g through the cooling through-holes 112 to 114.

According to the present embodiment, the opening width W2 of each of the cooling through-holes 112 to 114 in the inner part of the coil end portions 111f and 111g is smaller than the opening width W1 of that cooling through-hole in the outer part of the coil end portions 111f and 111g. Therefore, the liquid refrigerant R stays in the cooling through-holes 112 to 114 for a relatively long time. Thus, in the motor generator 1A according to the present embodiment, heat can be easily transferred from the coil end portions 111f and 111g to the liquid refrigerant R. As a result, the cooling performance of the motor generator 1A according to the present embodiment can be improved.

According to the present embodiment, the cooling through-holes 112 to 114 are formed by the spaces between the conductor segments 111a constituting the stator coil 111. Therefore, in the present embodiment, there is no need to prepare additional members for forming holes. Consequently, in the motor generator 1A according to the present embodiment, the cooling through-holes 112 to 114 can be easily formed.

According to the present embodiment, the cooling through-holes 112 to 114 are covered with the resin layers 112a, 113a, and 114a. Therefore, in the present embodiment, the flow resistance of the liquid refrigerant R can be reduced. Thus, in the motor generator 1A according to the present embodiment, a larger amount of liquid refrigerant R can be delivered. As a result, the cooling performance of the motor generator 1A according to the present embodiment can be further improved.

Second Embodiment

Next, a motor generator according to the second embodiment will be described. The motor generator according to the present embodiment is different from the motor generator according to the first embodiment in the following points. Specifically, the motor generator according to the present embodiment does not include any refrigerant inlet nozzle that introduces a liquid refrigerant from the outside to the inside. Instead, the motor generator according to the present embodiment includes refrigerant diffusion members and refrigerant supply through-holes. The refrigerant diffusion members diffuse the liquid refrigerant in the housing. The refrigerant supply through-holes supply the diffused liquid refrigerant to the outside of the coil end portions.

<Configuration of Motor Generator>

Figure 11:
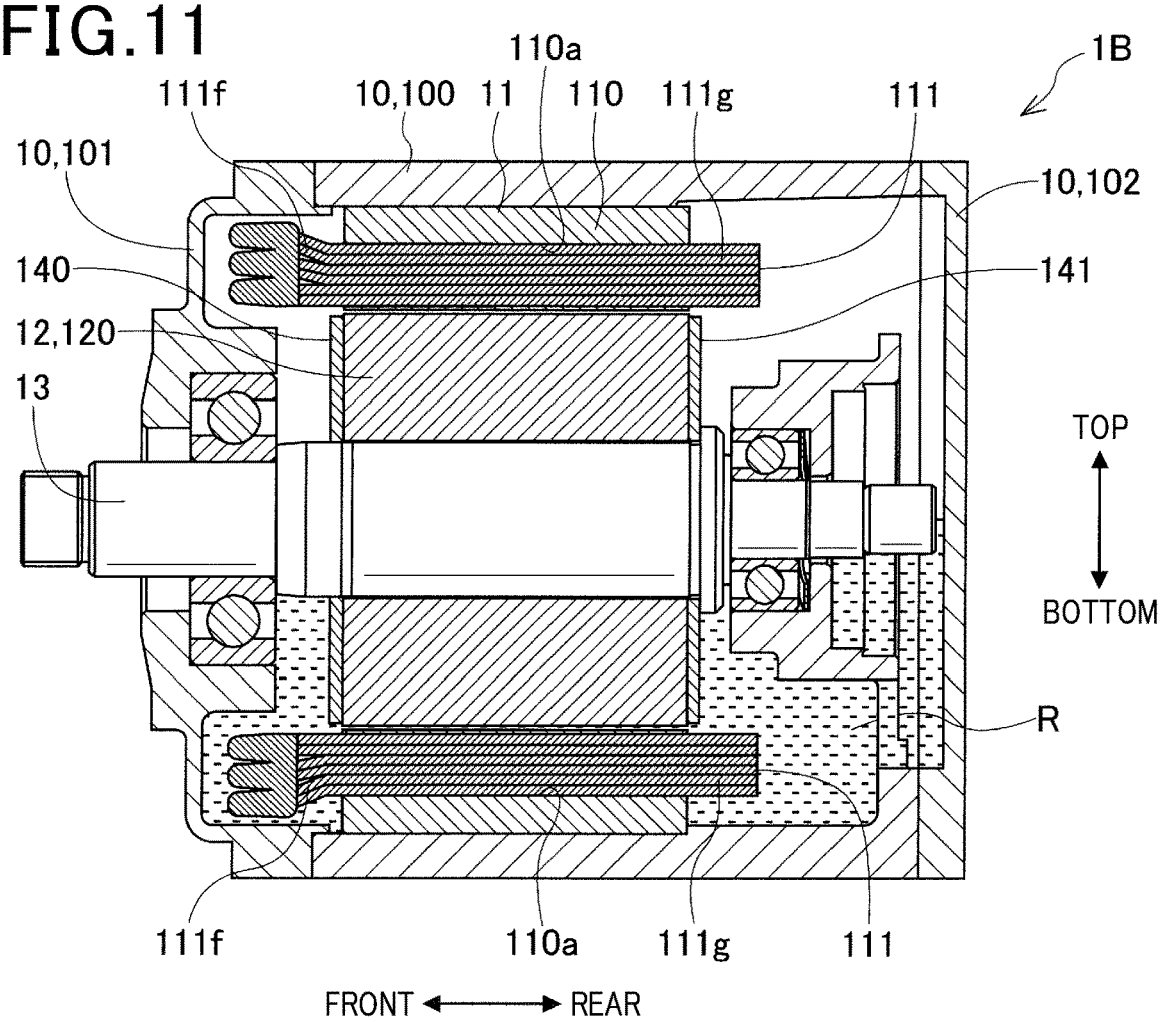
FIG. 11 is an axial cross-sectional view of a motor generator according to the second embodiment.
Figure 12:
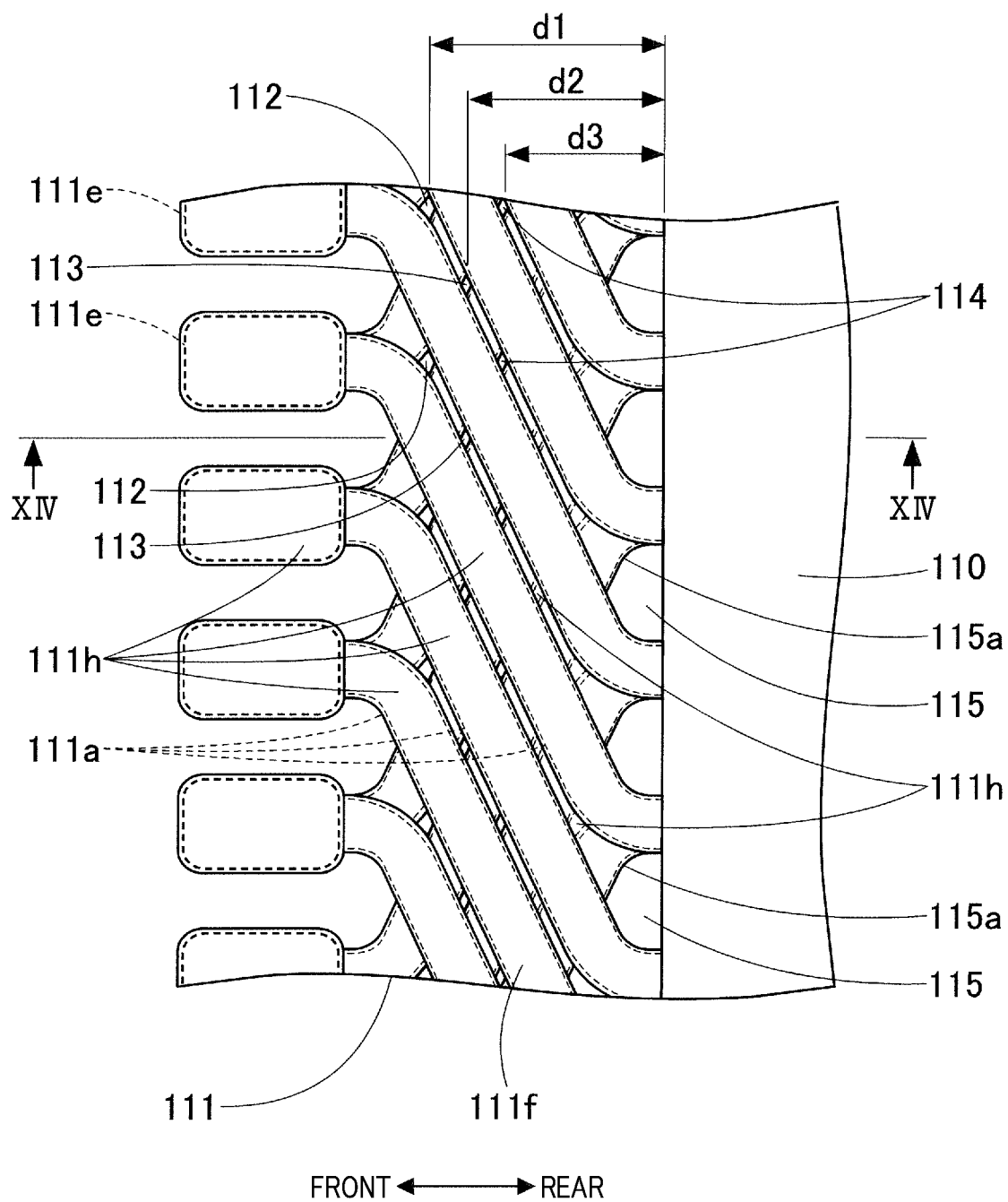
FIG. 12 is an outside partial enlarged view of FIG. 11 illustrating a region around a front coil end portion.
Figure 13:
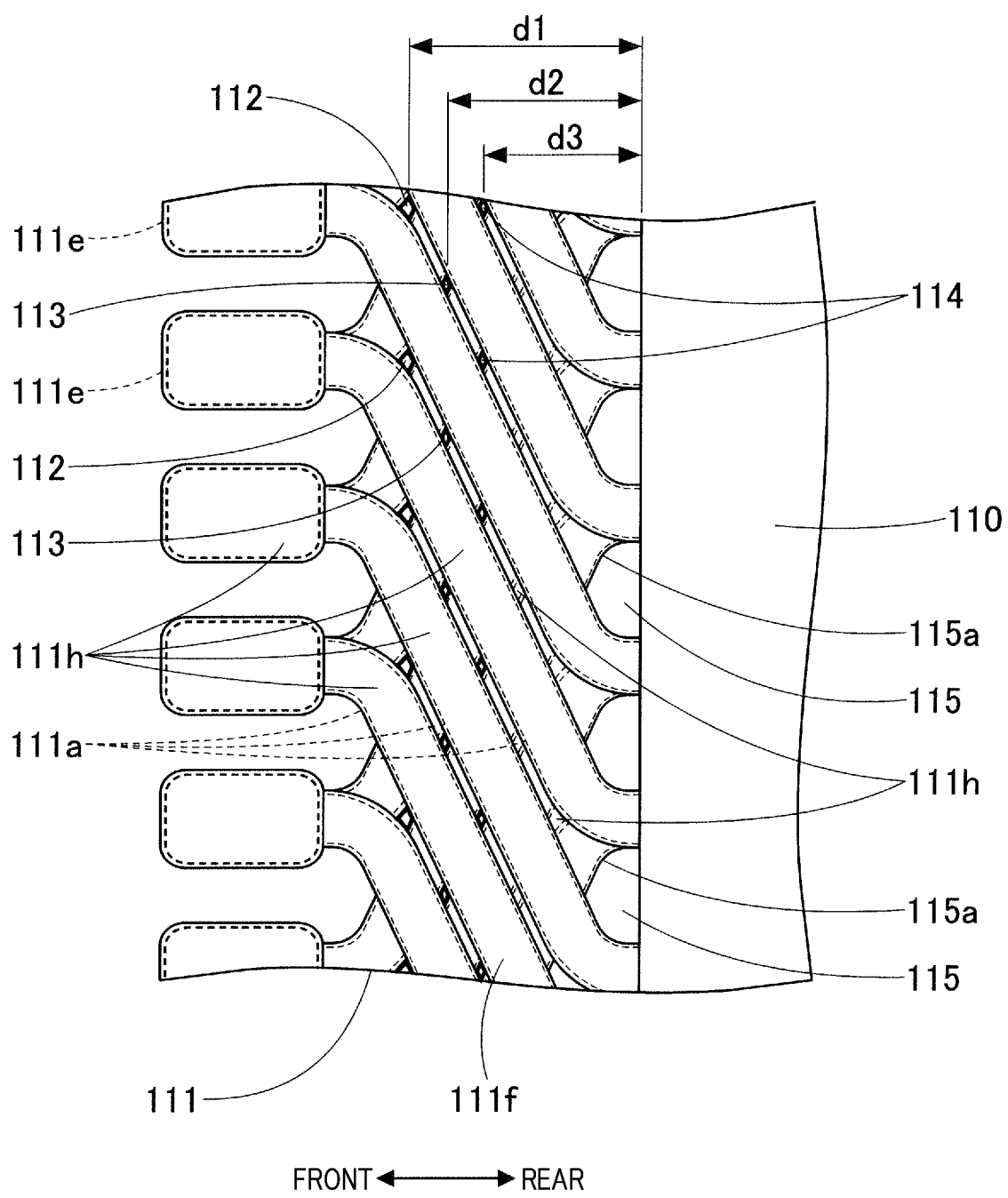
FIG. 13 is an inside partial enlarged view of FIG. 11 illustrating a region around the front coil end portion.

As described above, the motor generator according to the present embodiment is the same as the motor generator according to the first embodiment except the refrigerant diffusion members and the refrigerant supply through-holes. Therefore, only the refrigerant diffusion members and the refrigerant supply through-holes according to the present embodiment will be described with reference to FIGS. 11 to 16, and the other components are not described. The directions "front" and "rear" in the drawings are for descriptive purposes only. A part of FIG. 11 is immersed in a liquid refrigerant. This part is indicated by broken lines so that its configuration is clearly visible. In the following description, components identical to those of the first embodiment are denoted by the same reference signs and are not be described.

The motor generator 1B illustrated in FIG. 11 includes refrigerant supply through-holes 115 and refrigerant diffusion members 140 and 141. The motor generator 1B does not include any refrigerant inlet nozzle. Therefore, the liquid refrigerant R is in the housing 10 of the motor generator 1B.

As illustrated in FIGS. 12 to 15, the refrigerant supply through-holes 115 pass through the coil end portions 111f and 111g in the radial direction. The liquid refrigerant R flows through the refrigerant supply through-holes 115. Therefore, the refrigerant supply through-holes 115 supply the liquid refrigerant R stored in the lower part of the housing 10 to the outside of the coil end portions 111f and 111g. Specifically, the refrigerant supply through-holes 115 pass through the coil end portions 111f and 111g radially around the axial center of the stator core 110. The refrigerant supply through-holes 115 are provided adjacent to the axial front end of the stator core 110. The refrigerant supply through-holes 115 are provided at regular intervals over the entire circumference of the coil end portion 111f. The refrigerant supply through-holes 115 are formed by the spaces between the axial front end of the stator core 110 and the conductor segments 111a. More specifically, the refrigerant supply through-holes 115 are formed by the spaces between the crossing conductor segments 111a at positions that are closer to the axial front end of the stator core 110 than the cooling through-holes 114 are. The refrigerant supply through-holes 115 are covered with a resin layer 115a formed by the adhesive member 111h.

The refrigerant supply through-holes 115 are also formed in the coil end portion 111g in a similar manner (not illustrated).

The refrigerant diffusion members 140 and 141 illustrated in FIG. 11 are thin annular metal members. The refrigerant diffusion members 140 and 141 are provided on the rotor core 120 and rotate as the rotor 12 rotates to diffuse the liquid refrigerant R. The liquid refrigerant R is introduced in advance and stored in the lower part (indicated by broken lines in FIG. 11) of the housing 10. The refrigerant diffusion members 140 and 141 diffuse the stored liquid refrigerant R. Consequently, the liquid refrigerant R is supplied from the inside to the outside of the coil end portions 111f and 111g through the refrigerant supply through-holes 115. The refrigerant diffusion member 140 is fixed to the axial front end of the rotor core 120. The refrigerant diffusion member 140 at least partially faces the refrigerant supply through-holes 115 in the radial direction.

Note that the refrigerant diffusion member 141 is provided on the axial rear end of the rotor core 120 (not illustrated) in the same manner as the refrigerant diffusion member 140. More specifically, the refrigerant diffusion member 141 is fixed to the axial rear end of the rotor core 120. The refrigerant diffusion member 141 at least partially faces the refrigerant supply through-holes 115 in the radial direction.

<Description of Operation of Motor Generator and Cooling Performance>

The operation of the motor generator 1B according to the present embodiment is the same as the operation of the motor generator 1A according to the first embodiment. Therefore, the description is omitted. Next, how the liquid refrigerant R cools the coil end portions 111*f* and 111*g* of the motor generator 1B will be described with reference to FIG. 16.

Figure 16:
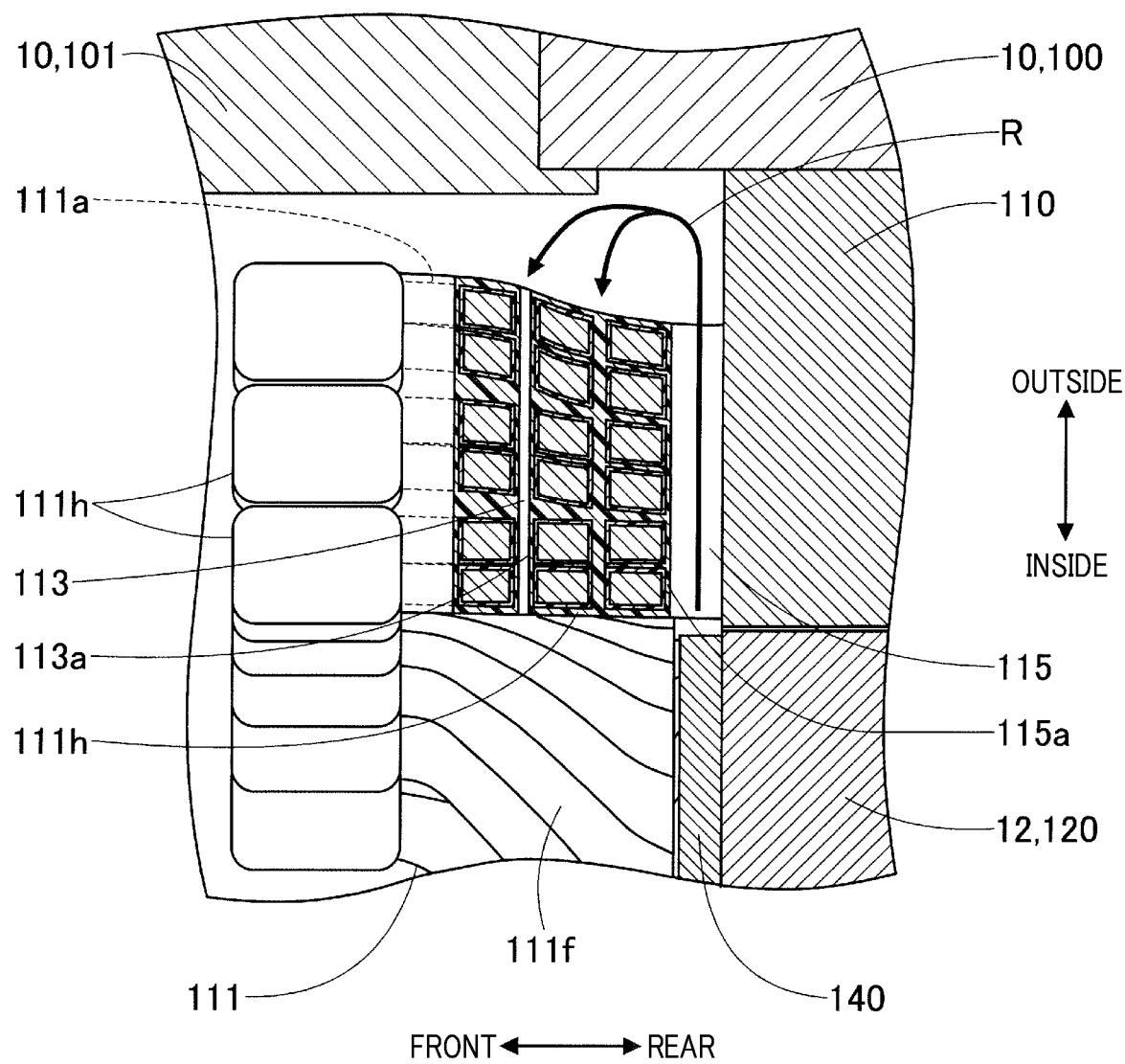
FIG. 16 is a partial enlarged cross-sectional view illustrating a region around the front coil end portion for explaining the flow of liquid refrigerant.

In the motor generator 1B, the refrigerant diffusion members 140 and 141 rotate as the rotor 12 rotates. The refrigerant diffusion members 140 and 141 diffuse the liquid refrigerant R stored in the lower part of the housing 10 outward. As a result, the diffused liquid refrigerant R is delivered toward the refrigerant supply through-holes 115 facing the refrigerant diffusion members 140 in the radial direction. Then, as illustrated in FIG. 16, in the motor generator 1B according to the present embodiment, the liquid refrigerant R is supplied from the inside to the outside of the coil end portions 111*f* and 111*g* through the refrigerant supply through-holes 115 in the part that is not immersed in the liquid refrigerant R. The refrigerant supply through-holes 115 have a larger flow capacity than the cooling through-holes 112 to 114. Therefore, in the motor generator 1B according to the present embodiment, a larger amount of liquid refrigerant R is supplied to the outside of the coil end portions 111*f* and 111*g*. The supplied liquid refrigerant R is dropped on the outer peripheral surfaces of the coil end portions 111*f* and 111*g*. The dropped liquid refrigerant R flows from the outside to the inside of the coil end portions 111*f* and 111*g* through the cooling through-holes 112 to 114. Consequently, the liquid refrigerant R cools the coil end portions 111*f* and 111*g* in the same manner as in the first embodiment. Then, the liquid refrigerant R is stored in the lower part of the housing 10. The stored liquid refrigerant R is diffused outward again by the refrigerant diffusion members 140 and 141 as the rotor 12 rotates, and supplied from the inside to the outside of the coil end portions 111*f* and 111*g* through the refrigerant supply through-holes 115.

<Effects>

Next, the effects of the motor generator 1B according to the present embodiment will be described.

The present embodiment has the same configuration as the first embodiment. Consequently, the motor generator 1B according to the present embodiment achieves the same effects as the first embodiment owing to the same configuration.

According to the present embodiment, the refrigerant supply through-holes 115 adjacent to the axial ends of the stator core 110 have a larger flow capacity than the cooling through-holes 112 to 114. The liquid refrigerant R is supplied from the inside to the outside of the coil end portions 111*f* and 111*g* through the refrigerant supply through-holes 115. Consequently, in the motor generator 1B according to the present embodiment, a larger amount of liquid refrigerant R can be supplied to the outside of the coil end portions 111*f* and 111*g*. As a result, in the motor generator 1B according to the present embodiment, a larger amount of liquid refrigerant R can be supplied to the cooling through-holes 112 to 114. Thus, the cooling performance of the motor generator 1B according to the present embodiment can be further improved as in the first embodiment.

According to the present embodiment, the motor generator 1B includes the rotor 12 and the refrigerant diffusion members 140 and 141. The rotor 12 is rotatably provided, with its outer peripheral surface facing the inner peripheral surface of the stator core 110 in the radial direction. The refrigerant diffusion members 140 and 141 rotate as the rotor 12 rotates to diffuse the liquid refrigerant R. Consequently, in the motor generator 1B according to the present embodiment, a larger amount of liquid refrigerant R can be reliably supplied to the outside of the coil end portions 111*f* and 111*g* through the refrigerant supply through-holes 115.

According to the present embodiment, the refrigerant diffusion members 140 and 141 at least partially face, in the radial direction, the refrigerant supply through-holes 115 adjacent to the axial ends of the stator core 110. Consequently, in the motor generator 1B according to the present embodiment, the liquid refrigerant R can be reliably delivered toward the refrigerant supply through-holes 115 due to the diffusion of the liquid refrigerant R. As a result, in the motor generator 1B according to the present embodiment, the liquid refrigerant R can be reliably supplied to the outside of the coil end portions 111*f* and 111*g* through the refrigerant supply through-holes 115.

According to the present embodiment, the refrigerant supply through-holes 115 are formed by the spaces between the axial ends of the stator core 110 and the conductor segments 111*a*. Therefore, in the present embodiment, there is no need to prepare additional members for forming holes. Consequently, in the motor generator 1B according to the present embodiment, the refrigerant supply through-holes 115 can be easily formed.

According to the present embodiment, the refrigerant supply through-holes 115 are covered with the resin layer 115*a*. Therefore, in the present embodiment, the flow resistance of the liquid refrigerant R can be reduced. Thus, in the motor generator 1B according to the present embodiment, a larger amount of liquid refrigerant R can be supplied to the outside of the coil end portions 111*f* and 111*g*.

(Modifications)

The technique of the present disclosure is not limited to the above embodiments. For example, the technique of the present disclosure can be modified within the technical range that does not depart from the gist of the disclosure. Specifically, the technique of the present disclosure may be modified for implementation as follows.

Figure 17:
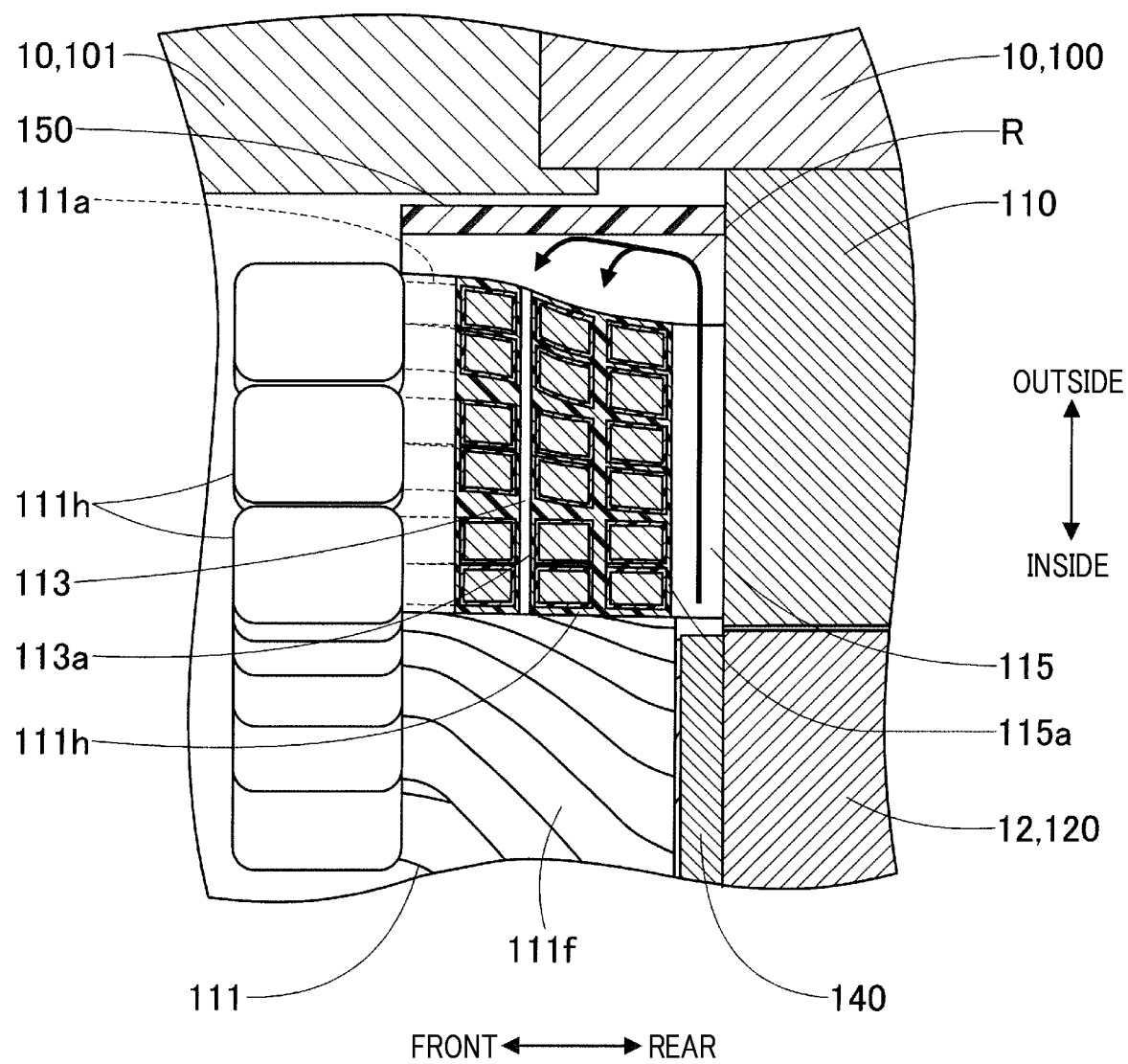
FIG. 17 is a partial enlarged cross-sectional view illustrating a region around the front coil end portion for explaining the flow of liquid refrigerant according to a modification of the second embodiment.

In the exemplary configuration of the second embodiment, the liquid refrigerant R is supplied to the outside of the coil end portions 111*f* and 111*g* through the refrigerant supply through-holes 115. The technique of the present disclosure is not limited to this configuration. For example, as illustrated in FIG. 17, the motor generator 1B may further include a refrigerant guide member 150 on the outside of the refrigerant supply through-holes 115. The refrigerant guide member 150 guides, to the cooling through-holes 112 to 114, the liquid refrigerant R diffused by the refrigerant diffusion member 140 through the refrigerant supply through-holes 115. For example, the liquid refrigerant R could be scattered by the refrigerant diffusion member 140 farther than expected. In order to solve this problem, the refrigerant guide member 150 of the motor generator 1B according to a modification prevents the liquid refrigerant R from being scattered farther than expected. Consequently, in the motor generator 1B according to a modification, the liquid refrigerant R supplied to the outside of the coil end portions 111*f* and 111*g* through the refrigerant supply through-holes 115 can be accurately guided to the cooling through-holes 112 to 114. In other words, the motor generator 1B according to a modification can avoid a situation where the liquid refrigerant R is scattered farther than expected and only a small amount of liquid refrigerant R is delivered to the cooling through-holes 112 to 114.

In the exemplary configuration of the second embodiment, the refrigerant diffusion members 140 and 141 are thin annular members. The technique of the present disclosure is not limited to this configuration. For example, the refrigerant diffusion members 140 and 141 may be fans. Alternatively, the refrigerant diffusion members 140 and 141 may be injection nozzles that inject the liquid refrigerant R. To sum up, the refrigerant diffusion members 140 and 141 may be any member that can diffuse and deliver the liquid refrigerant R toward the coil end portions 111f and 111g.

In the exemplary configuration of the second embodiment, the refrigerant diffusion members 140 and 141 are separate from the rotor core 120. The technique of the present disclosure is not limited to this configuration. For example, the refrigerant diffusion members 140 and 141 may be integrated with the rotor core 120. The refrigerant diffusion members 140 and 141 having the integrated configuration may be formed by extending the axial ends of the rotor core 120 in the axial direction. The refrigerant diffusion members 140 and 141 may at least partially face the refrigerant supply through-holes 115 in the radial direction.

In the exemplary configuration of the second embodiment, the refrigerant supply through-holes 115 are provided over the entire circumference of the coil end portions 111f and 111g. The technique of the present disclosure is not limited to this configuration. For example, the refrigerant supply through-holes 115 may be provided only in the parts of the coil end portions 111f and 111g which are not immersed in the liquid refrigerant R.

Figure 18:
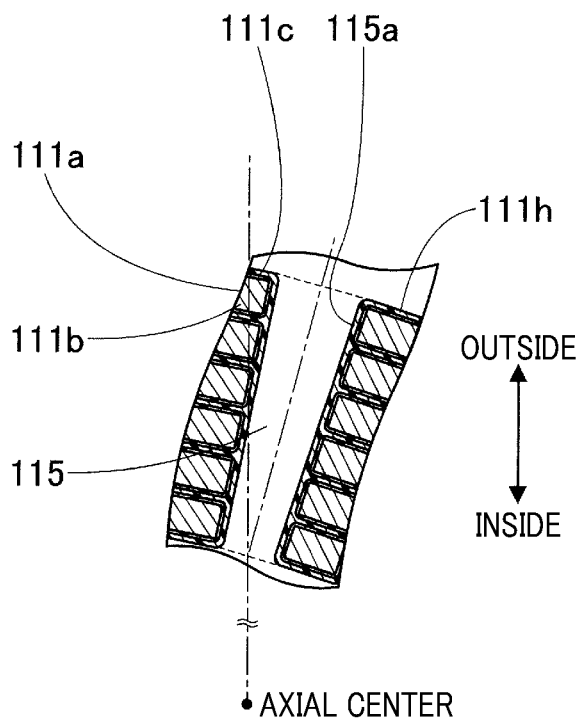
FIG. 18 is a front cross-sectional view illustrating a refrigerant supply through-hole according to a modification of the second embodiment.

In the exemplary configuration of the second embodiment, the refrigerant supply through-holes 115 pass through the coil end portions 111f and 111g radially around the axial center of the stator core 110. The technique of the present disclosure is not limited to this configuration. For example, as illustrated in FIG. 18, the refrigerant supply through-holes 115 may pass through the coil end portions 111f and 111g obliquely.

In the exemplary configuration of the first and second embodiments, the motor generators 1A and 1B include the three types of cooling through-holes 112 to 114. The technique of the present disclosure is not limited to this configuration. Specifically, the rotating electrical machine of the present disclosure only needs to include multiple types of cooling through-holes having different capacities that allow different amounts of liquid refrigerant R to flow.

Figure 6:
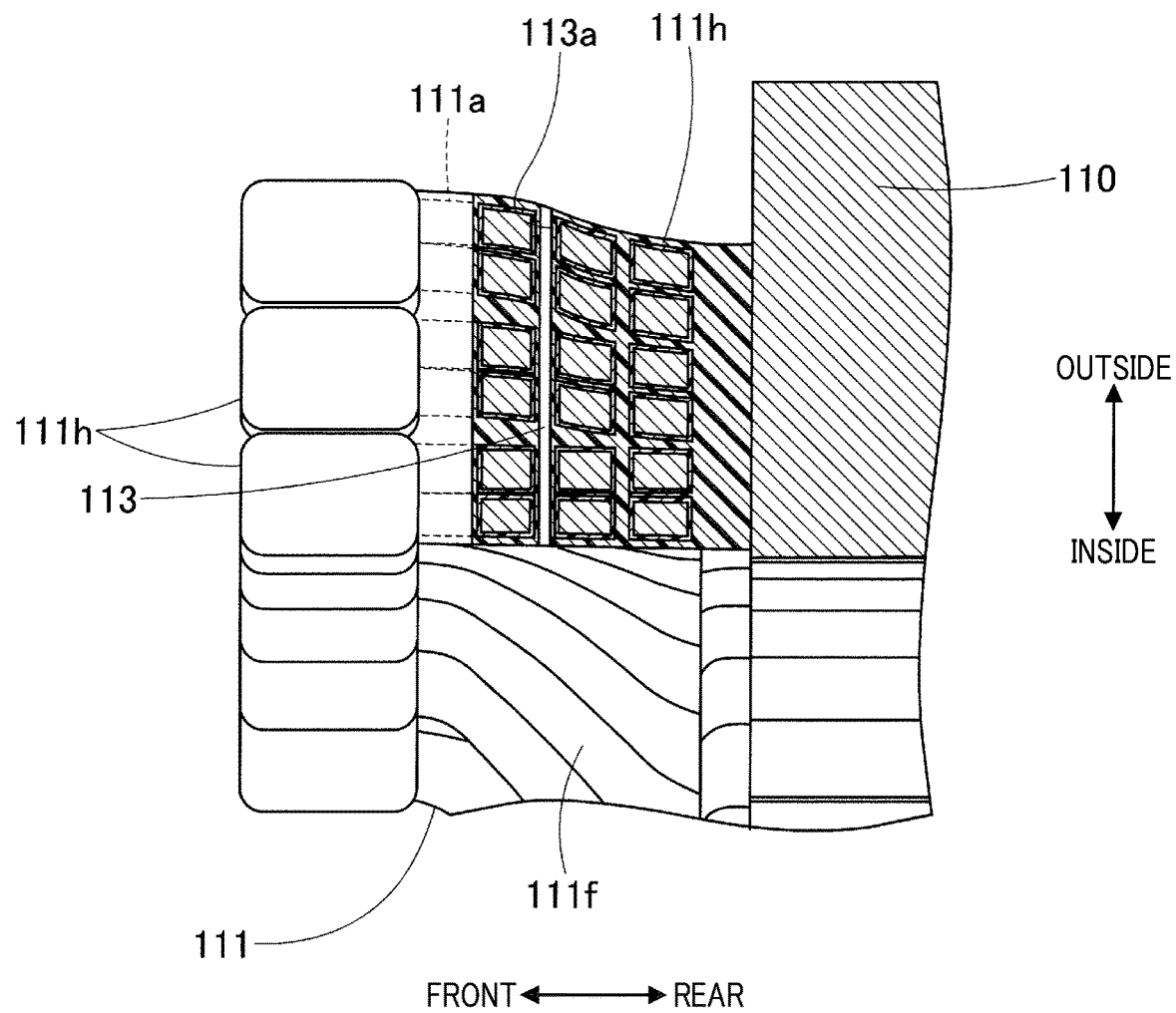
FIG. 6 is a cross-sectional view taken along VI-VI in FIG. 3.
Figure 14:
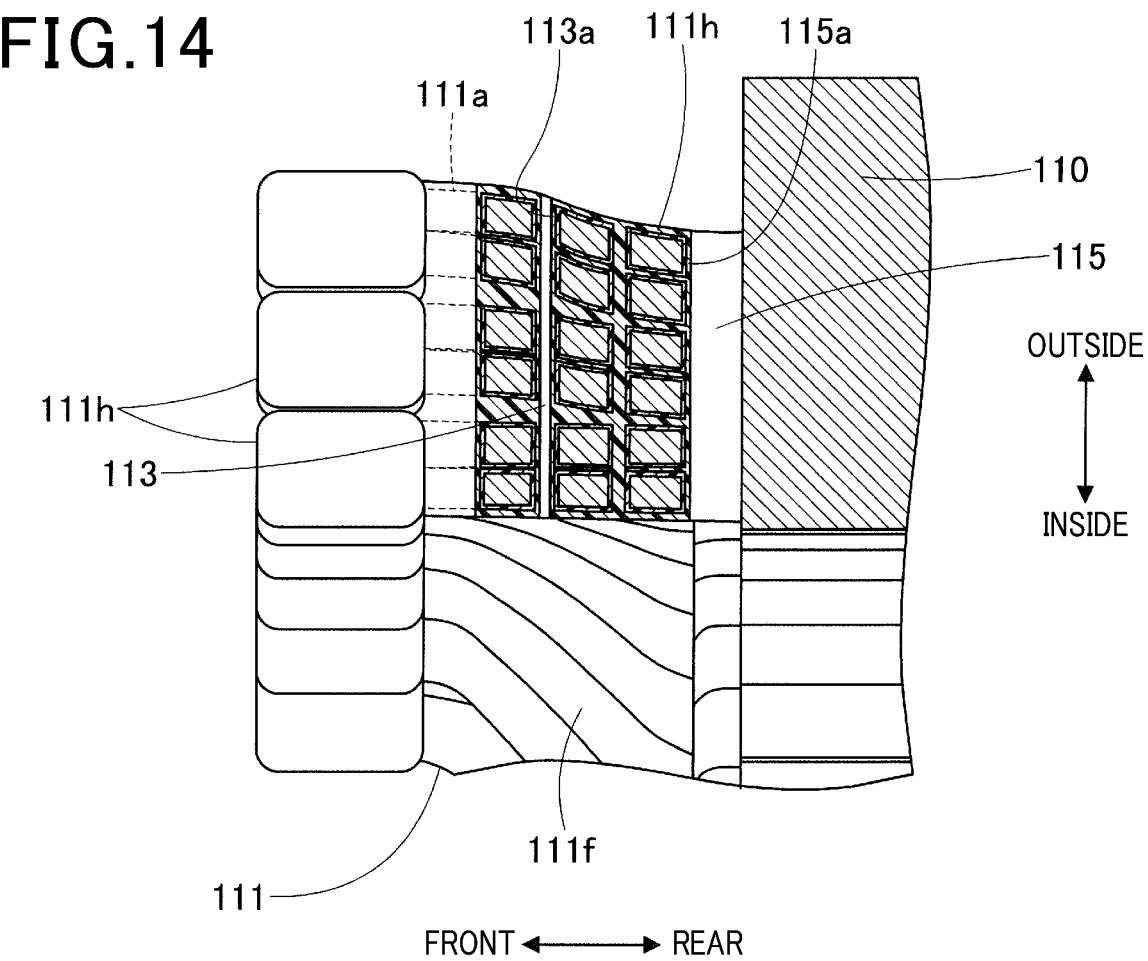
FIG. 14 is a cross-sectional view taken along XIV-XIV in FIG. 12.
Figure 15:
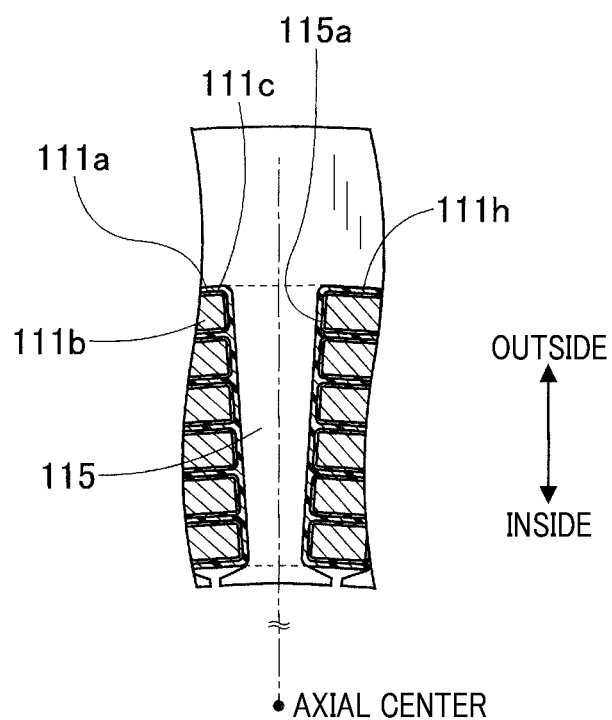
FIG. 15 is a front cross-sectional view of FIGS. 12 and 13 illustrating a refrigerant supply through-hole.
Figure 19:
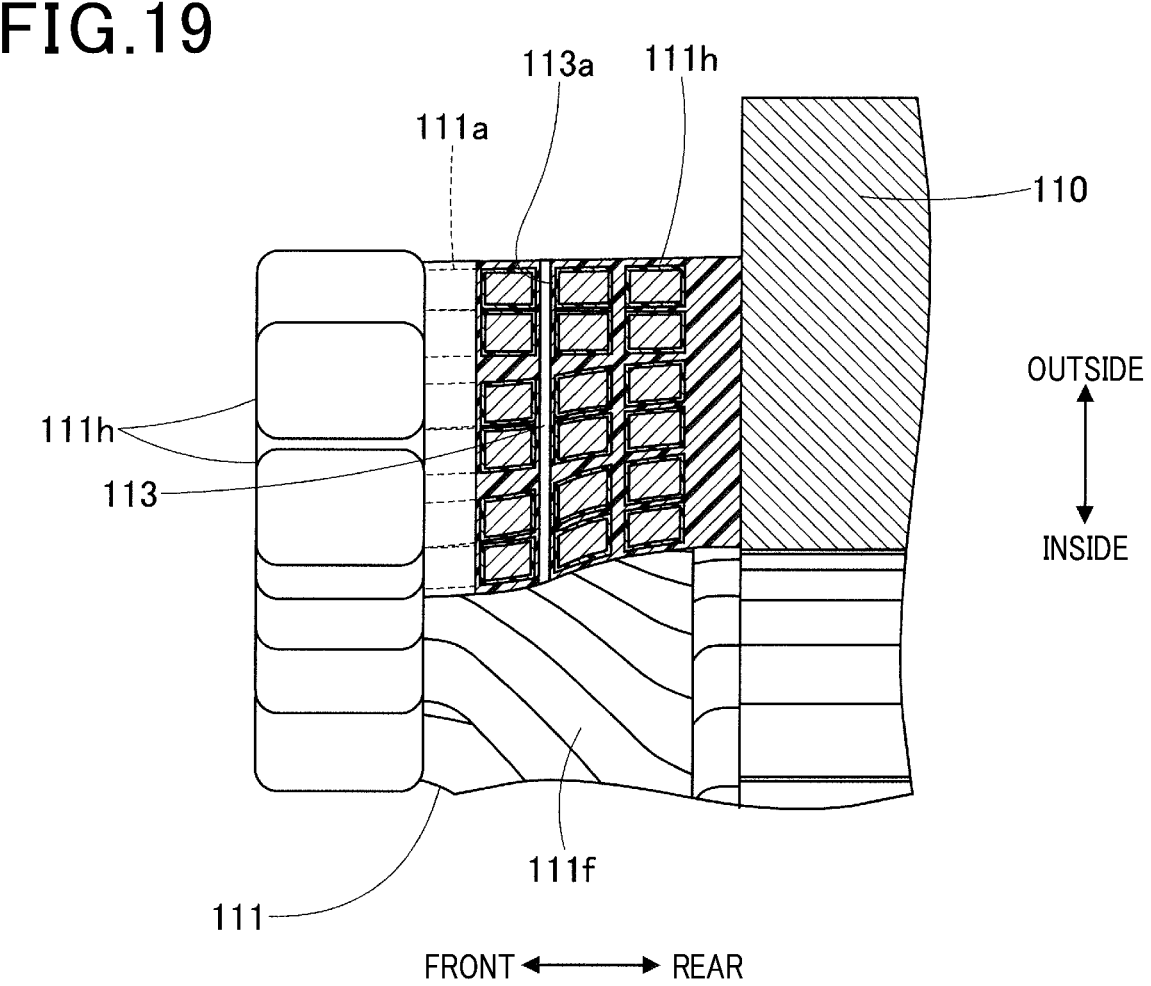
FIG. 19 is an enlarged cross-sectional view illustrating a region around the coil end portion according to a modification of the first and second embodiments.

In the example of the first and second embodiments, the distal end part of the coil end portion 111f extends outward (see FIGS. 5, 6, and 14). The technique of the present disclosure is not limited to this example. For example, as illustrated in FIG. 19, the distal end part of the coil end portion 111f may extend inward.

Figure 20:
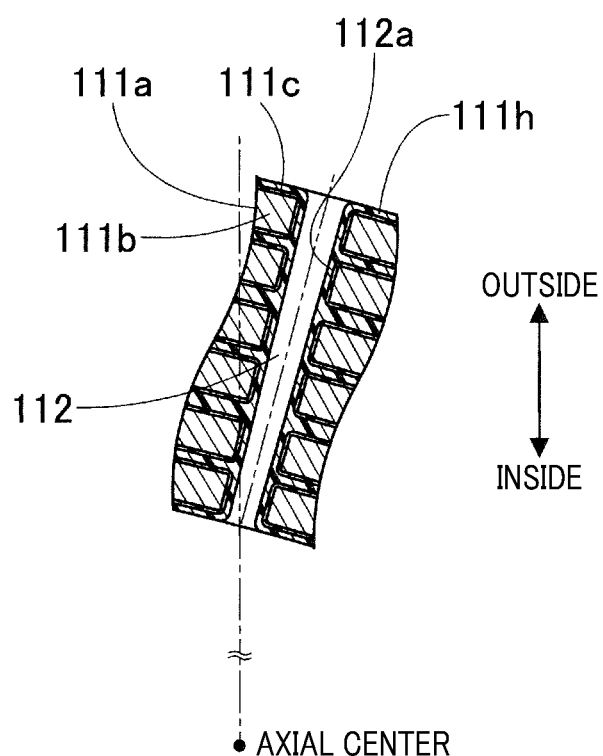
FIG. 20 is a front cross-sectional view illustrating a refrigerant supply through-hole according to a modification of the first and second embodiments.

In the exemplary configuration of the first and second embodiments, the cooling through-holes 112 to 114 pass through the coil end portions 111f and 111g radially around the axial center of the stator core 110. The technique of the present disclosure is not limited to this configuration. For example, as illustrated in FIG. 20, the cooling through-holes 112 to 114 may pass through the coil end portions 111f and 111g obliquely.

In the exemplary configuration of the first and second embodiments, the cooling through-holes 112 to 114 are provided at regular intervals over the entire circumference of the coil end portions 111f and 111g. The technique of the present disclosure is not limited to this configuration. For example, the cooling through-holes 112 to 114 may be provided only in the parts of the coil end portions 111f and 111g which are not immersed in the liquid refrigerant R.

What is claimed is:

1. A rotating electrical machine comprising:
    an annular stator core;
    a stator coil provided on the stator core and having a coil end portion protruding from an axial end of the stator core in an axial direction; and
    a plurality of cooling through-holes passing through the coil end portion in a radial direction and having different flow capacities that allow different amounts of liquid refrigerant to flow, wherein
    the cooling through-holes are provided in predetermined parts of the coil end portion that are to be cooled by a flow of the liquid refrigerant, and have different flow capacities depending on how far the cooling through-holes are from the axial end of the stator core in the axial direction, and
    the cooling through-holes located farther from the axial end of the stator core in the axial direction have larger flow capacities.

2. The rotating electrical machine according to claim 1, wherein
    an opening width of the cooling through-holes in an inner part of the coil end portion is smaller than an opening width of the cooling through-holes in an outer part of the coil end portion.

3. The rotating electrical machine according to claim 1, wherein
    the cooling through-holes are formed by spaces between conductors constituting the stator coil.

4. The rotating electrical machine according to claim 1, wherein
    the cooling through-holes are covered with a resin layer.

5. The rotating electrical machine according to claim 1, further comprising:
    a refrigerant supply through-hole provided adjacent to the axial end of the stator core and passing through the coil end portion in the radial direction, wherein
    the liquid refrigerant flows through the refrigerant supply through-hole, and
    the refrigerant supply through-hole has a larger flow capacity than the cooling through-holes.

6. A rotating electrical machine comprising:
    an annular stator core;
    a stator coil provided on the stator core and having a coil end portion protruding from an axial end of the stator core in an axial direction;
    a plurality of cooling through-holes passing through the coil end portion in a radial direction and having different flow capacities that allow different amounts of liquid refrigerant to flow; and
    a refrigerant supply through-hole provided adjacent to the axial end of the stator core and passing through the coil end portion in the radial direction, wherein
    the liquid refrigerant flows through the refrigerant supply through-hole, and
    the refrigerant supply through-hole has a larger flow capacity than the cooling through-holes.

7. The rotating electrical machine according to claim 6, further comprising:
    a rotor rotatably facing the stator core in the radial direction; and
    a refrigerant diffusion member that rotates as the rotor rotates to diffuse the liquid refrigerant.

8. The rotating electrical machine according to claim 7, wherein the refrigerant diffusion member at least partially faces the refrigerant supply through-hole in the radial direction.

9. The rotating electrical machine according to claim 7, further comprising:
a refrigerant guide member that guides the liquid refrigerant diffused by the refrigerant diffusion member to the cooling through-holes.

10. The rotating electrical machine according to claim 6, wherein
the refrigerant supply through-hole is formed by a space between the axial end of the stator core and conductors constituting the stator core.

11. The rotating electrical machine according to claim 6, wherein
the refrigerant supply through-hole is covered with a resin layer.

* * * * *